United States Patent
Kimura et al.

(10) Patent No.: US 7,935,328 B2
(45) Date of Patent: May 3, 2011

(54) METHOD FOR MANUFACTURING SCORODITE

(75) Inventors: Yukio Kimura, Hitachi (JP); Shigeo Katsura, Hitachi (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 170 days.

(21) Appl. No.: 12/010,377

(22) Filed: Jan. 24, 2008

(65) Prior Publication Data

US 2008/0233023 A1    Sep. 25, 2008

(30) Foreign Application Priority Data

Mar. 19, 2007  (JP) ................................. 2007-070427

(51) Int. Cl.
*C01G 49/02* (2006.01)
*C01G 1/02* (2006.01)

(52) U.S. Cl. .................................... 423/594.1; 423/601

(58) Field of Classification Search ................ 423/87, 423/594.1, 601, 602

See application file for complete search history.

(56) References Cited

U.S. PATENT DOCUMENTS

| | | | |
|---|---|---|---|
| 4,357,261 A | 11/1982 | Takahashi et al. | |
| 2007/0014709 A1* | 1/2007 | Moyes et al. | 423/22 |

FOREIGN PATENT DOCUMENTS

| | | |
|---|---|---|
| CA | 2 377 599 A1 | 12/2000 |
| CA | 2 605 005 A1 | 11/2006 |
| JP | 6-279879 A | 10/1994 |
| JP | 2005-161123 A | 6/2005 |
| JP | 3756687 B2 | 1/2006 |

OTHER PUBLICATIONS

Canadian Intellectual Property Office, Office Action dated Nov. 12, 2009.

* cited by examiner

*Primary Examiner* — Stanley Silverman
*Assistant Examiner* — James Fiorito
(74) *Attorney, Agent, or Firm* — Birch, Stewart, Kolasch & Birch, LLP

(57) ABSTRACT

The present invention provides a method for manufacturing scorodite in which scorodite may be obtained at high production efficiency and a high As concentration ratio. The present invention provides a method for manufacturing crystalline scorodite from acidic aqueous solution containing pentavalent As and trivalent Fe, the method comprising a step for adding a basic sodium compound to the acidic aqueous solution such that the sodium concentration in the acidic aqueous solution becomes larger than 0 g/L and equal to or less than 4 g/L.

5 Claims, 5 Drawing Sheets

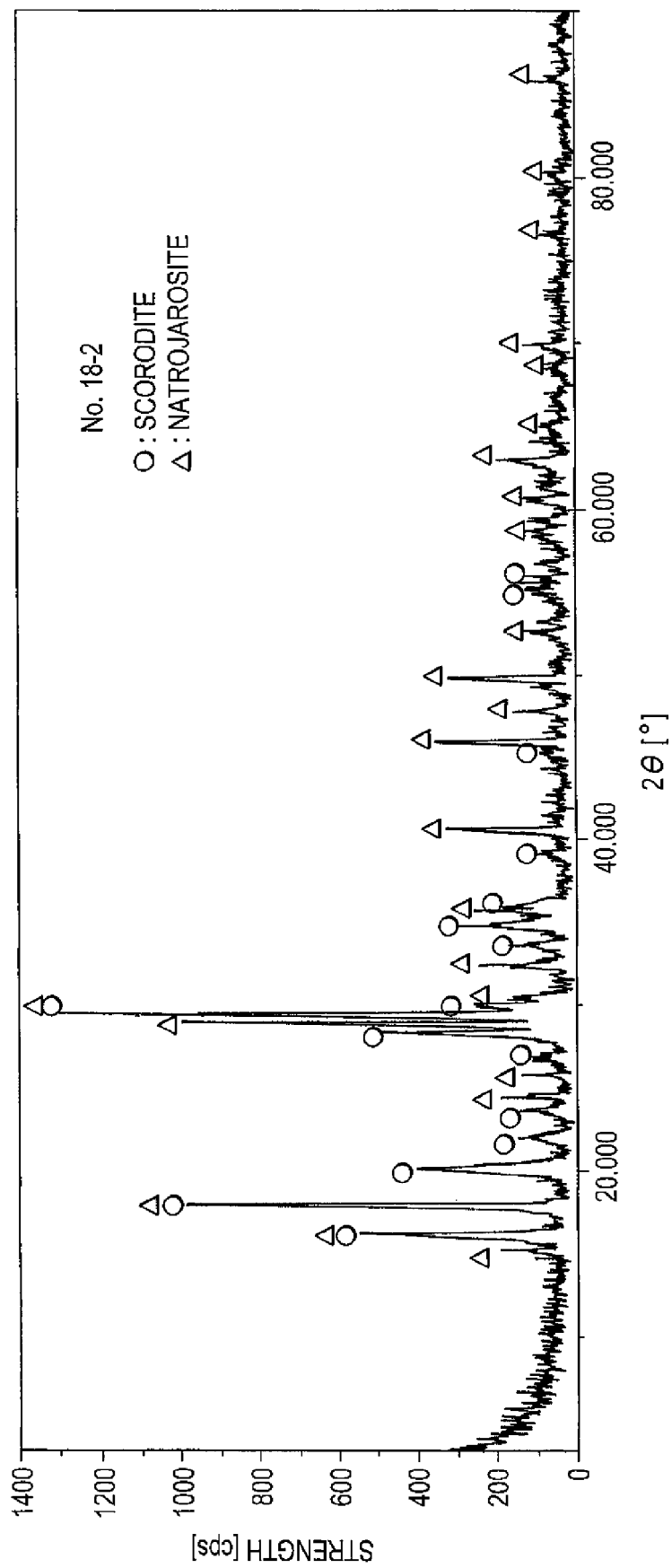

US 7,935,328 B2

METHOD FOR MANUFACTURING SCORODITE

FIELD OF THE INVENTION

The present invention relates to a method for manufacturing scorodite. In particular, the invention relates to a method for manufacturing scorodite from electrolytically precipitated copper produced in copper smelting process.

BACKGROUND OF THE INVENTION

Various impurities are contained in copper ore, and one of the impurities is arsenic (As). While most of arsenic (As) is evaporated and separated by a high temperature during a dry process of the copper smelting, it is partially entrained in crude copper and carried into the subsequent copper electrorefining process.

Part of As contained in the crude copper (copper anode) is eluted into electrolytic solution, and the remaining undissolved As is mixed in anode slime deposited on the bottom of an electrolytic tank. In addition, since the amount of copper eluted from the anode is generally larger than that of copper deposited on the cathode, the copper concentration will increase gradually in the electrolytic solution. Therefore, a part of the electrolytic solution is extracted into another electrolytic tank to control the quality of the electrolytic solution. Decoppering electrolysis is conducted to the extracted electrolytic solution to separate and recover Cu and impurities such as As by precipitating them on the cathode or depositing them on the bottom of the electrolysis bath. In this technical field, the substances deposited on the bottom of the electrolytic tank and those precipitated on the cathode are called as "electrolytically precipitated copper".

Electrolytically precipitated copper is typically fed back to the copper smelting process. For this purpose, impurities such as As should be desirably removed from the electrolytically precipitated copper. In addition, As in itself can be used as valuable material. Accordingly, there is a need for a technology to separate and recover As from electrolytically precipitated copper with high grade. In this regard, Japanese unexamined patent publication No. 6-279879 discloses a method comprising adding electrolytically precipitated copper to sulfuric acid solution so that leaching reaction occurs and then separating sulfuric acid-leached solution containing As and Cu from leaching residue containing Bi and Sb. The publication states in the examples section that electrolytically precipitated copper was added to 100 g/L sulfuric acid solution (the pH is speculated to be about −0.3) to cause the sulfuric acid leaching.

Furthermore, it has been known that crystallization of scorodite ($FeAsO_4 \cdot 2H_2O$), which is an iron-arsenic compound, is effective in fixing arsenic. Crystalline scorodite is chemically stable, and suitable for long-term storage. On the other hand, amorphous scorodite is not stable, therefore not suitable for long-term storage.

For example, Japanese patent No. 3,756,687 discloses a method for removing and fixing arsenic from solution containing arsenic and non-ferrous metal component including copper and/or zinc. The method comprises a first step of adding iron (II) solution and/or iron (III) solution to the arsenic-containing solution for reaction at 120° C. or higher to form scorodite having stable crystallinity as an iron-arsenic compound and then recovering scorodite containing non-ferrous metal components such as copper from the arsenic-containing solution by solid-liquid separation, and a second step of adding water to the obtained scorodite containing non-ferrous metal components such as copper for repulping so that the non-ferrous metal components such as copper is dissolved into the solution and separated from the scorodite.

The patent states that in this way arsenic can be removed and fixed as stable crystalline scorodite without losing valuable metals such as copper.

Furthermore, Japanese unexamined patent publication No. 2005-161123 discloses a method for removing arsenic from soot containing arsenic. The method comprises a leaching step for leaching arsenic from the arsenic-containing soot with acid solution, a precipitation reaction step for precipitating amorphous iron arsenate by mixing iron ion-containing acidic aqueous solution in the leached solution, and a crystallization step for crystallizing the amorphous iron arsenate by heating the mixed solution. The crystallized iron arsenate is removed by filtering the mixed solution.

The publication states that the method can remove arsenic from soot very easily since it needs no additional processes, such as pH adjustment, once the iron ion-containing acidic aqueous solution is mixed in the leached solution.

Furthermore, it states in the embodiment section that sulfuric acid solution (concentration is 0.2 mol/L, i.e., pH is about 0.4) was used to leach arsenic from soot, and the pH of both the leached solution and the iron ion-containing acidic aqueous solution (ferric sulfate) was 1.0 to 1.5.

PROBLEMS TO BE SOLVED BY THE INVENTION

Even if crystalline scorodite was formed under the condition stated in Jpn. pat. No. 3,756,687 or Jpn. pat. pub. No. 2005-161123, highly concentrated As could not be obtained in some cases. In particular, although Jpn. pat. pub. No. 2005-161123 states that the proper pH for forming scorodite is 1.0 to 1.5, the formation of scorodite was sometimes insufficient and As concentration ratio thus decreased even though the pH was adjusted to the above range.

Therefore, the object of the present invention is to provide a method for manufacturing scorodite in which scorodite may be obtained at high production efficiency and a high As concentration ratio.

MEANS FOR SOLVING THE PROBLEM

In the manufacture of scorodite from electrolytically precipitated copper, components such as Bi and Sb should desirably be removed by sulfuric acid leaching in advance to facilitate the separation and recovery of valuable material. However, since sulfuric acid concentration used for the sulfuric acid leaching is often adjusted to higher level for the sake of better leaching efficiency, the pH of resulting sulfuric acid-leached solution may become less than 1.0. In such cases, alkali is added as appropriate to adjust the pH to 1.0 to 1.5, which pH range is appropriate for forming crystalline scorodite. However, such alkaline component forms sulfate, hampering the formation of crystalline scorodite or forming together with crystalline scorodite, thus decreasing the arsenic concentration ratio.

The inventors have found out that a sodium compound is effective as the alkali for pH adjustment. That is, when a sodium compound is used as the alkali, it does not hamper the formation of crystalline scorodite until it exceeds a certain amount. To be more specific, we have found out that the synthesis of crystalline scorodite is hardly hampered when the sodium concentration in the reaction medium is 4 g/L or less. The present invention has been made based on the aforementioned findings.

Accordingly, in one aspect, the invention is a method for manufacturing crystalline scorodite from acidic aqueous solution containing pentavalent As and trivalent Fe, the method comprising a step for adding a basic sodium compound to the acidic aqueous solution such that the sodium concentration in the acidic aqueous solution becomes larger than 0 g/L and equal to or less than 4 g/L.

In one embodiment of the invention, the basic sodium compound is at least one compound selected from the group consisting of sodium carbonate, sodium hydroxide, and sodium hydrogen carbonate.

In another embodiment of the invention, the pH of the acidic aqueous solution is less than 1.0 before the addition of the basic sodium compound and 1.0 to 1.5 after the addition.

In a further embodiment of the invention, the trivalent Fe is provided as ferric sulfate.

In a further embodiment of the invention, the acidic aqueous solution is sulfuric acid-leached solution from electrolytically precipitated copper.

ADVANTAGEOUS EFFECT OF THE INVENTION

The present invention prevents the formation of by-products during the crystalline scorodite synthesis, thereby enabling the selective scorodite synthesis. Therefore, it enables, for example, to fix arsenic from electrolytically precipitated copper at a high concentration ratio.

BRIEF DESCRIPTION OF THE DRAWINGS

FIG. 5 shows the XRD of scorodite crystal in Comparative Example 3 of the invention.

BEST MODE FOR CARRYING OUT THE INVENTION

Figure 1:
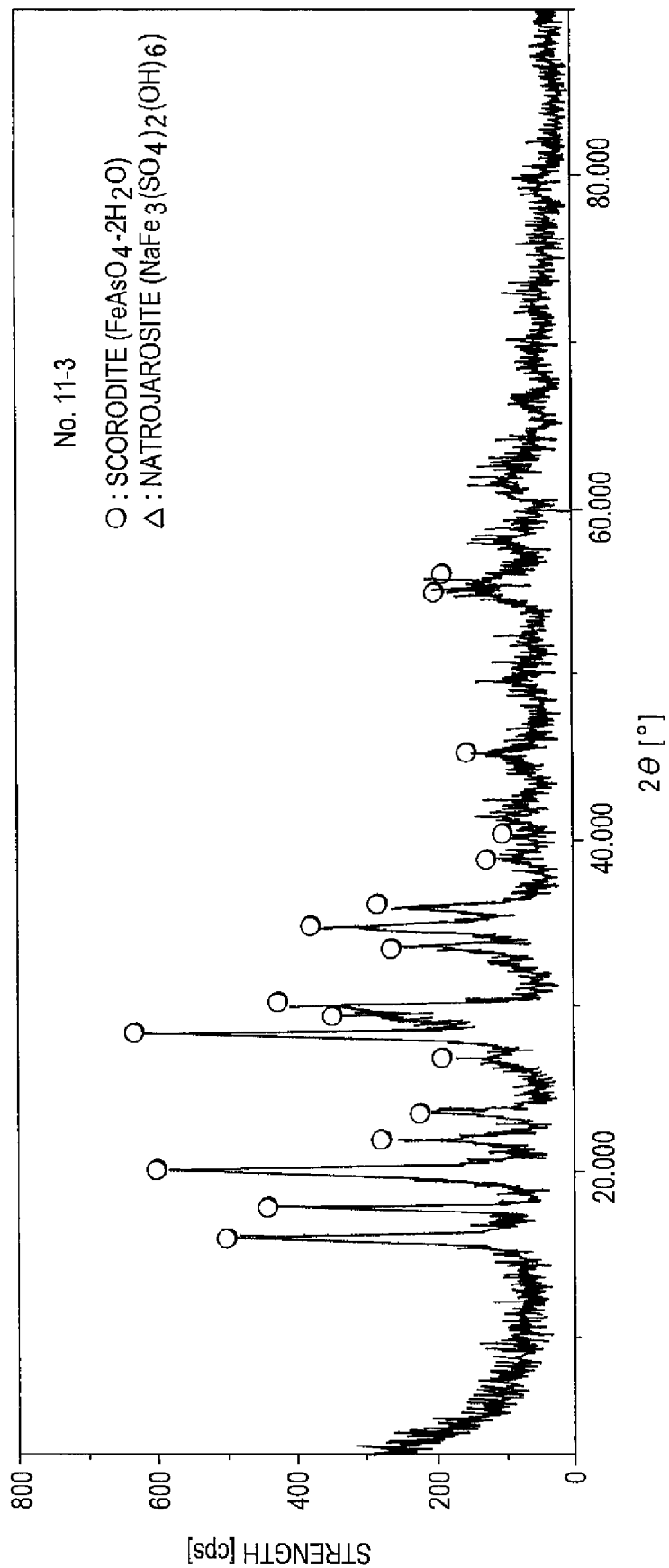
FIG. 1 shows the XRD of scorodite crystal in Example 1 of the invention.

As stated above, the invention is characterized by the step for adding a basic sodium compound to acidic aqueous solution containing pentavalent As and trivalent Fe such that the sodium concentration in the acidic aqueous solution becomes larger than 0 g/L and equal to or less than 4 g/L in the manufacture of crystalline scorodite from the acidic aqueous solution.

The pentavalent As may be provided, for example, in the form of arsenic acid ($H_3AsO_4$), and the trivalent Fe may be provided, for example, in the form of iron oxide, iron sulfate, iron chloride and iron hydroxide. The acidic aqueous solution may be provided, for example, as hydrochloric acid acidity solution, sulfuric acid acidity solution, perchloric acid acidity solution, or the like. As a typical example, the pentavalent As exists in the form of arsenic acid ($H_3AsO_4$) in sulfuric acid-leached solution obtained by the sulfuric acid leaching of electrolytically precipitated copper.

The sulfuric acid leaching of electrolytically precipitated copper can be performed, for example, in the following manner.

Firstly, electrolytically precipitated copper is optionally water-washed. In the water-washing, the electrolytically precipitated copper may be repulped with water and stirred for 0.5 to 6 hours to dissolve the components of the electrolytic solution (including copper sulfate, Ni and Fe, which were deposited during the manufacture of the electrolytically precipitated copper, and minute amounts of Ni, Fe and the like contained in the electrolytically precipitated copper, and then the resulting slurry may be filtered and separated into solid and liquid. This process enables to separate most part of Fe and Ni from the electrolytically precipitated copper.

However, the primary purpose of this process is to determine the amount of zero-valent copper, which is water-insoluble, in the total copper amount, i.e., the amount of copper excluding copper sulfate, in the electrolytically precipitated copper in order to more precisely determine the amount of sulfuric acid necessary for sulfuric acid leaching performed in the subsequent process. This process may not be necessary when minor elements such as Ni and Fe are not of particular concern, when the amount of copper sulfate is already known, or when the amount of the electrolytic solution introduced into the electrolytically precipitated copper is small.

After the optional water-washing, the sulfuric acid leaching is performed by feeding an oxygen-containing gas into the electrolytically precipitated copper in the sulfuric acid acidity solution and stirring the solution under temperature and time conditions sufficient to oxidize As component contained in the electrolytically precipitated copper to pentavalence. Then, it is separated into solid, i.e., a leaching residue containing Sb and Bi components, and liquid, i.e., sulfuric acid-leached solution containing pentavalent As component.

The leaching reaction occurred in this process is generally represented by the following formula, and Cu is oxidized to $Cu^{2+}$ and As is oxidized to $As^{+5}$.

$$Cu+H_2SO_4+\tfrac{1}{2}O_2 \rightarrow CuSO_4+H_2O \qquad (1)$$

$$2As+5/2O_2+3H_2O \rightarrow 2H_3AsO_4 \qquad (2)$$

The usage of sulfuric acid is preferably 1.0 to 1.2 equivalents based on Cu. Below 1.0 equivalents, the leached solution becomes a weak acid, thereby forming precipitates such as $Cu_3AsO_4$ and decreasing the leaching ratio of Cu and As. Above 1.2 equivalents, the usage of sulfuric acid becomes large although there is no adverse effect on the leaching ratio of Cu and As. Although there is no particular restriction on the concentration of Cu and As in the sulfuric acid solution, the leaching ratio will decrease if the concentration exceeds the solubility. Therefore, the concentration of Cu and As is preferably no larger than the solubility of $Cu^{2+}$ and $As^{5+}$.

Furthermore, although the suitable pH for the formation of crystalline scorodite is 1.0 to 1.5, lower sulfuric acid concentration tends to decrease the efficiency of the sulfuric acid leaching, i.e., the recovery ratio of copper and arsenic. Therefore, the sulfuric acid concentration used in the sulfuric acid leaching is preferably determined such that the pH becomes less than 1. Therefore, in such case, the pH of the sulfuric acid-leached solution often becomes less than 1. In addition, even if the pH of the sulfuric acid-leached solution is equal to or more than 1, the trivalent iron added for the scorodite synthesis is preferably supplied in the form of acidic aqueous solution as described later. For example, the pH of ferric sulfate solution and poly ferric sulfate solution is around 0.6. In this case, the pH often becomes less than 1 upon the addition of the trivalent iron.

The sulfuric acid leaching may be conducted with stirring for instance at 70 to 95° C. for 4.5 to 11 hours, preferably at 80 to 95° C. for 7 to 11 hours to oxidize As to pentavalence. Since the sulfuric acid leaching is exothermic reaction, it can be done without the application of external heat. The stirring may be conducted for a longer period, and the actual time may be determined as appropriate based on cost and efficacy.

To improve the oxidation efficiency of As, the bubbles of the introduced oxygen-containing gas should be smaller in size, and enough amount of the gas (e.g., 10 equivalents of oxygen based on copper per 7 hours) should be supplied. Therefore, stronger stirring is preferable. For example, the feeding and/of stirring of the oxygen-containing gas is preferably performed by jet injection. The aforementioned value applied to a process using jet injection (Jet Ajiter™). Therefore, when using a conventional agitator having turbine blades, twice the reaction time or more is necessary even if 3.5 times the amount of the oxygen-containing gas or more is introduced. By controlling the valence of As at this stage, the scorodite formation at later stage becomes easier. $Cu^{2+}$ also has the effect of accelerating the As oxidation.

There is no particular restriction on the type of oxygen-containing gas unless it gives any adverse effect on the aforementioned reaction. For example, pure oxygen or a mixture of oxygen and inert gas can be used. It is preferably air in terms of handling and cost.

Acidic aqueous solution containing pentavalent As and trivalent Fe may be obtained by adding trivalent iron to the sulfuric acid-leached solution of electrolytically precipitated copper. In this case, examples of the trivalent iron include iron oxide, iron sulfate, iron chloride and iron hydroxide. However, the trivalent iron should desirably be supplied in the form of acidic aqueous solution since in terms of reacting in aqueous solution. Furthermore, since the most effective way is to return the post-deferrization solution to the electrolytic solution used in the electrical smelting, it is preferably supplied in the form of ferric sulfate ($Fe_2(SO_4)_3$) aqueous solution. Poly ferric sulfate, which is used in drainage treatment, can be also used.

The amount of trivalent iron necessary to remove As is equal to or larger than 1.0 equivalent based on As, and is preferably 1.1 to 1.5 equivalents in terms of cost.

A basic sodium compound is added to the acidic aqueous solution to achieve a proper pH value for the scorodite synthesis. The addition amount is determined such that the sodium concentration in the solution becomes larger than 0 g/L and equal to or less than 4 g/L, and preferably larger than 0 g/L and equal to or less than 2.5 g/L. While the adjustment of pH value cannot be made unless the sodium compound is added, addition of more than 4 g/L of the sodium compound tends to form Natrojarosite ($NaFe_3(SO_4)_2(OH)_6$), decreasing the arsenic concentration ratio.

There is no particular restriction on the addition timing of the sodium compound provided that it is added with a proper pH value. It may be added before the synthesis (i.e., before the heating) or during the heating. However, it is preferably added before the heating for the sake of the effective synthesis of stable scorodite.

Examples of the basic sodium compound include, but not limited to, sodium hydroxide, sodium carbonate, and sodium hydrogen carbonate. As a typical example, sodium hydroxide may be used. Incidentally, alkalis such as potassium hydroxide, calcium hydroxide and calcium carbonate may be regarded as the potential additive. However, when potassium hydroxide is used, it is not only undesirable in terms of cost, but also tends to form precipitate of jarosite ($KFe_3(SO_4)_2(OH)_6$) as a by-product. Furthermore, calcium hydroxide and calcium carbonate are also undesirable since they easily form a calcium sulfate (gypsum) precipitation and decrease the arsenic concentration ratio.

The pH of the acidic aqueous solution after the addition of the basic sodium compound is preferably 0.3 to 2.2. When the pH becomes less than 0.3, the solubility of crystalline scorodite increases rapidly, thereby hampering the crystalline scorodite formation. Furthermore, when the pH is greater than 2.2, the added iron precipitates as iron hydroxide, resulting in ineffective use of iron for the scorodite synthesis. The effectiveness of the crystalline scorodite formation becomes higher especially when the pH of the acidic aqueous solution is 1.0 to 1.5.

Crystalline scorodite can be formed by, for example, heating the acidic aqueous solution at 60 to 95° C. under the atmospheric pressure. For example, 8 to 72 hours of reaction will form a sufficient amount of crystalline scorodite. Since As has been oxidized to pentavalence, it reacts with the trivalent iron at high efficiency and forms crystalline scorodite. Crystalline scorodite is chemically stable, and suitable for long-term storage. By separating the product into solid and liquid, i.e., a residue containing crystalline scorodite and a post-dearsenic solution, arsenic can be recovered as scorodite.

EXAMPLES

Examples in accordance with the invention will be explained hereinafter for the better understanding of the invention and advantages thereof. However, the invention is not limited to the examples.

Example 1

Ferric sulfate solution (formed by dissolving 57.3 g of ferric sulfate reagent (n hydrate, iron(III) content was about 21.3%) in warm water; 2.0 equivalents of iron(III) based on arsenic) was added to 23.7 g of 60% arsenic acid solution manufactured by Wako Pure Chemical Industries, Ltd. (the content of arsenic was 33.8%). Then, the solution was diluted with water to 640 mL. Since the pH of the mixed solution was 0.75, 17 mL of 25% NaOH solution was added to adjust the pH to 1.0. Na concentration in the mixed solution was 3.8 g/L (measured by an ICPAES analyzer, Model No. SPS3100 available from Seiko Instruments Inc.). Then, the solution was heated to 95° C., during which the amount of the solution was concentrated to 640 mL, and the scorodite synthesis was conducted for 24 hours. During the heating, the amount of the solution was kept to 640 mL by adding water as appropriate to prevent the excessive decrease of the solution due to evaporation. Although the reaction did not progress immediately after the mixture of the arsenic acid solution and ferric sulfate solution at room temperature, the precipitation of scorodite was observed at around 60° C. as the mixture was heated. After the synthesis of scorodite, the scorodite crystal was filtered and separated into solid and liquid. The scorodite crystal was washed with water, and the wash water was added to the post-filtration solution. Table 1 shows the amount of the obtained scorodite crystal and post-crystal filtration solution. The arsenic content in the scorodite was 30% and high arsenic concentration ratio was obtained. FIG. 1 shows the XRD of the obtained scorodite. Arsenic elution was little, and crystalline scorodite, which is considered to be stable, was obtained. The crystallization of Natrojarosite was not observed.

Figure 2:
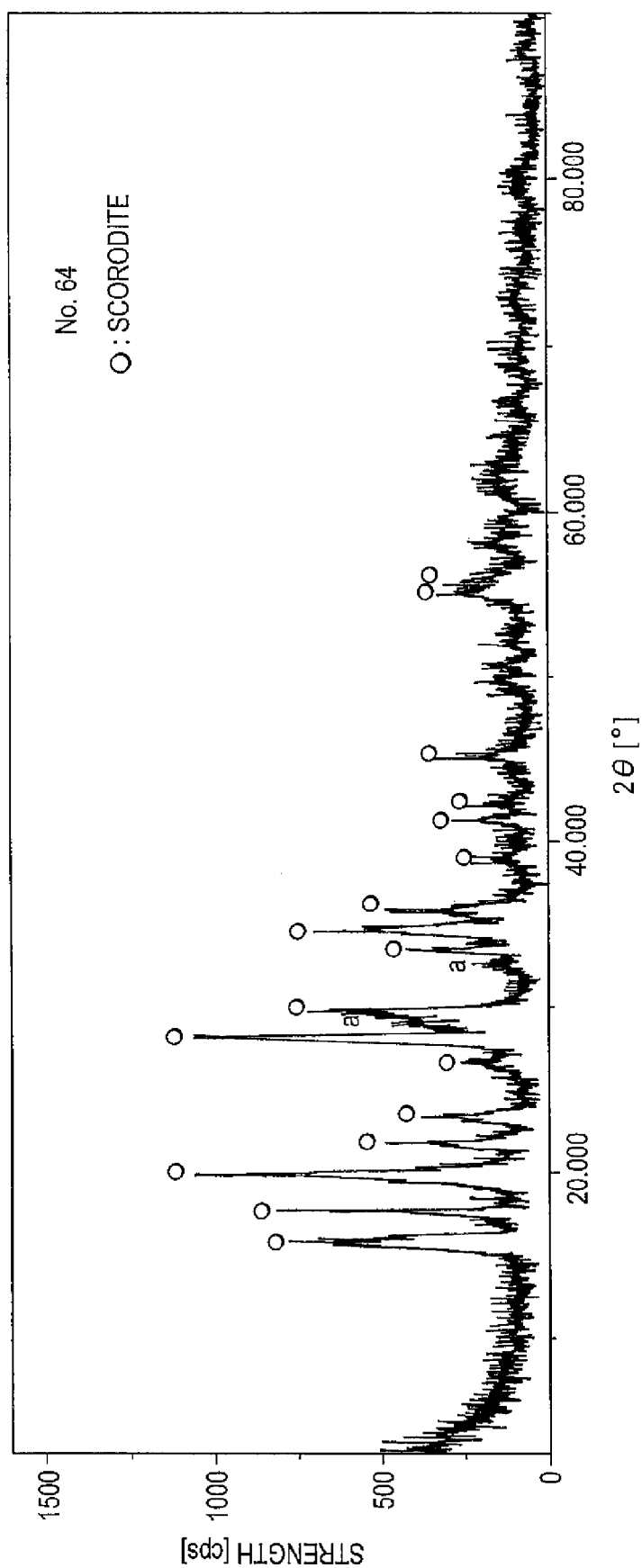
FIG. 2 shows the XRD of scorodite crystal in Example 2 in of the invention.

Incidentally, the arsenic elution from the scorodite obtained by this synthesis was 0.99 mg/L (TCLP, acetic acid buffer solution having the pH of 5 was used), and therefore it was confirmed that the arsenic was stable. This result also shows that the obtained scorodite was crystalline.

having the concentration of 40 g/L was added to adjust the pH to 1.0. Na concentration in the mixed solution was 0.15 g/L (measured by an ICPAES analyzer, Model No. SPS3100 available from Seiko Instruments Inc.). Then, the solution was heated to 95° C., during which the amount of the solution was concentrated to 650 mL, and the scorodite synthesis was conducted for 24 hours. During the heating, the amount of the solution was kept to 650 mL by adding water as appropriate to prevent the excessive decrease of the solution due to evaporation. Although the reaction did not progress immediately after the mixture of the arsenic acid solution and ferric sulfate solution at room temperature, the precipitation of scorodite was observed at around 40° C. as the mixture was heated. After the scorodite synthesis, the scorodite crystal was filtered and separated into solid and liquid. The scorodite crystal was washed with water, and the wash water was added to the post-filtration solution. Table 2 shows the amount of the obtained scorodite crystal and post-crystal filtration solution. The arsenic content in the scorodite was 31% and the arsenic concentration ratio was high. FIG. 2 shows the XRD of the obtained scorodite crystal. Crystalline scorodite, which is believed to shows little arsenic elution and to be stable, was obtained. The crystallization of Natrojarosite was not observed.

Incidentally, arsenic elution from the scorodite obtained by this synthesis was 0.2 mg/L (TCLP, acetic acid buffer solution having the pH of 5 was used), therefore it was confirmed that the arsenic was stable. The result also shows that the obtained scorodite was crystalline.

TABLE 1

| arsenic acid solution | | | | ferric sulfate (n hydrate) | | | |
|---|---|---|---|---|---|---|---|
| amount (ml) | 23.7 content (%) | number of moles (mol) | (molecular weight) | amount (ml) | 57.3 content (%) | number of moles (mol) | (molecular weight) |
| T-As | 33.8 | 0.107 | 74.92 | T-As | 0.0 | | |
| T-Fe | 0.0 | | | T-Fe | 21.3 | 0.218 | 55.85 |
| | | | | S | 18.3 | 0.327 | 32.070 |
| | | | | Na | | | | adjusting pH to 1.0 with 17 mL of 25% NaOH solution scorodite synthesis pH = 1.0, 95° C. 24 hrs

| amount (ml) | 640 content (%) | number of moles (mol) | (molecular weight) |
|---|---|---|---|
| T-As | 12.5 | 0.107 | 74.92 |
| T-Fe | 19.0 | 0.218 | 55.85 |
| S | 16.4 | 0.327 | 32.070 |
| Na | 3.8 | 0.106 | 22.990 |

| scorodite crystal | | | | post-filtration solution | | | |
|---|---|---|---|---|---|---|---|
| amount (Dg) | 15.9 content (%) | number of moles (mol) | (molecular weight) | amount (ml) | 1380 content (%) | number of moles (mol) | (molecular weight) |
| T-As | 30.0 | 0.064 | 74.92 | T-As | 2.28 | 0.042 | 74.92 |
| T-Fe | 25.0 | 0.071 | 55.85 | T-Fe | 6.67 | 0.165 | 55.85 |
| S | 1.4 | 0.007 | 32.070 | S | | 0.000 | 32.070 |
| Na | 0.0 | 0.000 | 22.990 | Na | | 0.000 | 22.990 |

Example 2

After 54.0 mL of ferric sulfate manufactured by Nittetsu mining Co., Ltd. (referred hereinafter as poly iron) was added to 370 mL of the sulfuric acid-leached solution from electrolytically precipitated copper (the manufacturing method will be explained later), the solution was diluted with water to 650 mL (1.5 equivalents of iron(III) based on arsenic). Since the pH of the mixed solution was 0.97, 5 mL of NaOH solution

TABLE 2 sulfuric acid leaching post-filtration solution
pH 1.56 As: 7 g

| amount (ml) | 370 content (%) | number of moles (mol) | (molecular weight) |
|---|---|---|---|
| As | 19.00 | 0.094 | 74.92 |
| Fe | 0.00 | 0.000 | 55.85 |
| Cu | 31.00 | 0.180 | 63.55 |
| Sb | 0.35 | 0.001 | 121.76 |
| Bi | 0.04 | 0.000 | 208.98 |
| Ni | 0.11 | 0.001 | 58.69 |
| Pb | 0.02 | 0.000 | 207.21 |
| Ca | 0.00 | 0.000 | 40.08 |
| SiO2 |  | 0.000 | 60.09 |
| S | 14.00 | 0.162 | 32.07 |
| H2SO4 | 6.5 | 0.024 | 98.07 | poly ferric sulfate Fe/As = 1.5 (actual value 1.54)

| amount (ml) | 54.0 content (%) | number of moles (mol) | (molecular weight) |
|---|---|---|---|
| T-As | 0.00 |  | 74.92 |
| T-Fe | 150.00 | 0.145 | 55.85 |
| T-Cu |  |  | 63.55 |
| Sb |  |  | 121.76 |
| Bi |  |  | 208.98 |
| Ni |  |  | 58.69 |
| Pb |  |  | 207.21 |
| Ca | 0.0 | 0.000 | 40.08 |
| SiO2 |  |  | 60.09 |
| S | 120.0 | 0.202 | 32.07 |
| H2SO4 |  |  | 98.07 | adding 5 mL of 40 g/L NaOH solution scorodite synthesis pH = 1.0, 95° C., 24 hrs

| amount (ml) | 650 content (%) | number of moles (mol) | (molecular weight) |
|---|---|---|---|
| As | 10.82 | 0.094 | 74.92 |
| Fe | 12.46 | 0.145 | 55.85 |
| Cu | 17.65 | 0.180 | 63.55 |
| Sb | 0.20 | 0.001 | 121.76 |
| Bi | 0.02 | 0.000 | 208.98 |
| Ni | 0.06 | 0.001 | 58.69 |
| Pb | 0.01 | 0.000 | 207.21 |
| Ca | 0.00 | 0.000 | 40.08 |
| SiO2 | 0.00 | 0.000 | 60.09 |
| S | 17.94 | 0.364 | 32.07 |
| Na | 0.15 | 0.004 | 22.99 |
| H2SO4 | 6.5 | 0.024 | 98.07 | pH 1.0 ORP 625 mV scorodite crystal

| amount (Dg) | 25.1 content (%) | number of moles (mol) | (molecular weight) |
|---|---|---|---|
| As | 31.00 | 0.10 | 74.92 |
| Fe | 24.00 | 0.11 | 55.85 |
| Cu | 1.10 | 0.00 | 63.55 |
| Sb | 0.46 | 0.00 | 121.76 |
| Bi | 0.01 | 0.00 | 208.98 |
| Ni |  | 0.00 | 58.69 |
| Pb | 0.01 | 0.00 | 207.21 |
| Ca | 0.00 | - | 40.08 |
| SiO2 |  | 0.00 | 60.09 |
| S | 1.50 | 0.01 | 32.07 |
| Na | 0.00 | 0.000 | 22.99 | post-filtration solution

| amount (ml) | 1660 content (%) | number of moles (mol) | (molecular weight) |
|---|---|---|---|
| As | 0.11 | 0.00 | 74.92 |
| Fe | 1.80 | 0.05 | 55.85 |
| Cu | 7.00 | 0.18 | 63.55 |
| Sb | 0.01 | 0.00 | 121.76 |
| Bi | 0.00 | 0.00 | 208.98 |
| Ni |  | 0.00 | 58.69 |
| Pb | 0.00 | 0.00 | 207.21 |
| Ca | 0.01 | 0.00 | 40.08 |
| SiO2 |  | 0.00 | 60.09 |
| S | 6.50 | 0.34 | 32.07 |
| Na | 0.030 | 0.002 | 22.99 |

[Method for Manufacturing Sulfuric Acid-Leached Solution from Electrolytically Precipitated Copper]

A method for manufacturing the electrolytically precipitated copper, which was used in Example 2, is explained hereinafter.

(1) Water-Washing Process of Electrolytically Precipitated Copper 2000 g (wet weight) of electrolytically precipitated copper was repulped with 5000 mL of water and stirred for four hours to dissolve the components of the electrolytic solution (including copper sulfate, Ni and Fe) which were deposited during the manufacture of the electrolytically precipitated copper. The slurry was then filtered and separated into solid and liquid. The obtained residue was dried, and used for sulfuric acid leaching in the next step. The weight of the dried residue was 1423 g. Table 3 shows the analytical values. Incidentally, the purpose of this process is to determine the amount of zero-valent copper, which is water-insoluble, in the total copper amount, i.e., the amount of copper excluding copper sulfate, in the electrolytically precipitated copper in order to more precisely determine the amount of sulfuric acid necessary for sulfuric acid leaching performed in the subsequent process. This process may not be necessary when the amount of copper sulfate is already known, or when the amount of the electrolytic solution introduced into the electrolytically precipitated copper is small.

TABLE 3 electrolytically precipitated copper (Wet)

| amount (Wg) | 2000.0 content (%) | number of moles (mol) | (molecular weight) |
|---|---|---|---|
| H2O | 11.33 | | |

electrolytically precipitated copper (Dry)

| amount (Dg) | 1773.4 content (%) | number of moles (mol) | (molecular weight) |
|---|---|---|---|
| As | 28.0 | 6.63 | 74.92 |
| Fe | 0.04 | 0.01 | 55.85 |
| Cu | 41.0 | 11.44 | 63.55 |
| Sb | 2.10 | 0.31 | 121.76 |
| Bi | 2.00 | 0.17 | 208.98 |
| Ni | 1.00 | 0.30 | 58.69 |
| Pb | 1.90 | 0.16 | 207.21 |
| Ca | 0.00 | - | 40.08 |
| Si | 0.00 | 0.00 | 60.09 |
| S | 3.60 | 1.99 | 32.07 | pH 0.70

| electrolytically precipitated copper (Dry) water-washing: 5 L, 4 hrs | | | | post-filtration liquid (electrolytically precipitated copper pre-treated solution) | | | |
|---|---|---|---|---|---|---|---|
| amount (Dg) | 1423.1 content (%) | number of moles (mol) | (molecular weight) | amount (ml) | 5900 content (%) | number of moles (mol) | (molecular weight) |
| As | 34.00 | 6.46 | 74.92 | As | 4.90 | 0.39 | 74.92 |
| Fe | 0.00 | 0.00 | 55.85 | Fe | 0.15 | 0.02 | 55.85 |
| Cu | 48.00 | 10.75 | 63.55 | Cu | 5.20 | 0.48 | 63.55 |
| Sb | 2.60 | 0.30 | 121.76 | Sb | 0.02 | 0.00 | 121.76 |
| Bi | 2.50 | 0.17 | 208.98 | Bi | 0.05 | 0.00 | 208.98 |
| Ni | 0.25 | 0.06 | 58.69 | Ni | 2.40 | 0.30 | 58.69 |
| Pb | 2.80 | 0.19 | 207.21 | Pb | 0.01 | 0.00 | 207.21 |
| Ca | 0.03 | - | 40.08 | Ca | 0.00 | - | 40.08 |
| Si | 0.01 | 0.00 | 60.09 | SiO2 | | 0.00 | 60.09 |
| S | 14.00 | 0.19 | 32.07 | S | 11.00 | 0.66 | 98.07 |

(2) Sulfuric Acid Leaching of Electrolytically Precipitated Copper

To 185 g (dry weight) of the water-washed electrolytically precipitated copper was added 145 g of 98% concentrated sulfuric acid (1.04 equivalents based on the amount of copper contained in the electrolytically precipitated copper), and then water was added such that the amount of the slurry became 1850 mL (the slurry concentration was 100 g/L). The leaching was performed with feeding air at the flow rate of 700 mL/minute and stirring for 7 hours. To improve the reaction efficiency, the bubbles of the introduced air should be smaller in size. Therefore, Jet Ajiter (manufactured by Shimazaki Mixing Equipment Co., Ltd.) was used for the air feeding and stirring. Incidentally, the liquid temperature was not controlled. However, since the sulfuric acid leaching is exothermic reaction, the liquid temperature rose to 88° C. after 3 hours from the start of the leaching, then gradually decreased, and was 70° C. after 7 hours. After the sulfuric acid leaching, the leached components were filtered and separated into solid and liquid. The residue was washed with water, and the wash water was added to the sulfuric acid-leached solution. Table 4 shows the amount of the obtained sulfuric acid-leached solution and sulfuric acid leaching residue.

TABLE 4 electrolytically precipitated copper water washing residue (Dry)

| amount (Dg) | 185 content (%) | number of moles (mol) | (molecular weight) |
|---|---|---|---|
| As | 34.0 | 0.840 | 74.92 |
| Fe | 0.0 | - | 55.85 |
| Cu | 48.0 | 1.397 | 63.55 |
| Sb | 2.6 | 0.040 | 121.76 |
| Bi | 2.5 | 0.022 | 208.98 |
| Ni | 0.3 | 0.008 | 58.69 |
| Pb | 2.8 | 0.025 | 207.21 |
| Ca | 0.0 | - | 40.08 |
| SiO2 | 0.0 | 0.000 | 60.09 |
| S | 0.4 | 0.025 | 32.07 |
| H2SO4 | - | - | 98.07 |

98% sulfuric acid (addition amount is 1.04 equivalents based on copper)

| amount (g) | 145.0 content (%) | number of moles (mol) | (molecular weight) |
|---|---|---|---|
| As | 19.00 | 0.094 | 74.92 |
| Fe | 0.00 | 0.000 | 55.85 |
| Cu | 31.00 | 0.180 | 63.55 |
| Sb | 0.35 | 0.001 | 121.76 |
| Bi | 0.04 | 0.000 | 208.98 |
| Ni | 0.11 | 0.001 | 58.69 |
| Pb | 0.02 | 0.000 | 207.21 |
| Ca | 0.00 | 0.000 | 40.08 |
| SiO2 | | 0.000 | 60.09 |
| S | 14.00 | 0.162 | 32.07 |
| H2SO4 | 14.00 | 0.162 | 32.07 | sulfuric acid leaching: 100 g/l, 70° C., 7 hrs, air 700 ml/min (Jet Ajiter)

| amount (Dg) | 1850 content (%) | number of moles (mol) | (molecular weight) |
|---|---|---|---|
| As | 34.0 | 0.840 | 74.92 |
| Fe | - | - | 55.85 |
| Cu | 48.0 | 1.397 | 63.55 |
| Sb | 2.6 | 0.040 | 121.76 |
| Bi | 2.5 | 0.022 | 208.98 |
| Ni | 0.3 | 0.008 | 58.69 |
| Pb | 2.8 | 0.025 | 207.21 |
| Ca | - | - | 40.08 |
| SiO2 | 0.0 | 0.000 | 60.09 |
| S | 87.7 | 0.025 | 32.07 |
| H2SO4 | 77.0 | - | 98.07 | pH 1.56    ORP 421 mV sulfuric acid leaching residue (Dry)

| amount (Dg) | 33.9 content (%) | number of moles (mol) | (molecular weight) |
|---|---|---|---|
| As | 19.00 | 0.086 | 74.92 |
| Fe | 0.02 | - | 55.85 |
| Cu | 13.00 | 0.069 | 63.55 |
| Sb | 11.00 | 0.031 | 121.76 |
| Bi | 15.00 | 0.024 | 208.98 |
| Ni | 0.02 | 0.000 | 58.69 |
| Pb | 12.00 | 0.020 | 207.21 |
| Ca | 0.02 | - | 40.08 |
| SiO2 | 0.23 | 0.001 | 60.09 |
| S | 1.70 | 0.018 | 32.07 |
| H2SO4 | | - | 98.07 | post-sulfuric acid leaching and filtration solution

| amount (g) | 2855 content (%) | number of moles (mol) | (molecular weight) |
|---|---|---|---|
| As | 19.00 | 0.72 | 74.92 |
| Fe | 0.00 | 0.00 | 55.85 |
| Cu | 31.00 | 1.39 | 63.55 |
| Sb | 0.35 | 0.01 | 121.76 |
| Bi | 0.04 | 0.00 | 208.98 |
| Ni | 0.11 | 0.01 | 58.69 |
| Pb | 0.02 | 0.00 | 207.21 |
| Ca | 0.00 | 0.00 | 40.08 |
| SiO2 | | 0.00 | 60.09 |
| S | 14.00 | 1.246 | 32.07 |
| H2SO4 | 0.25 | 0.01 | 32.07 |

Comparative Example 1

Figure 3:
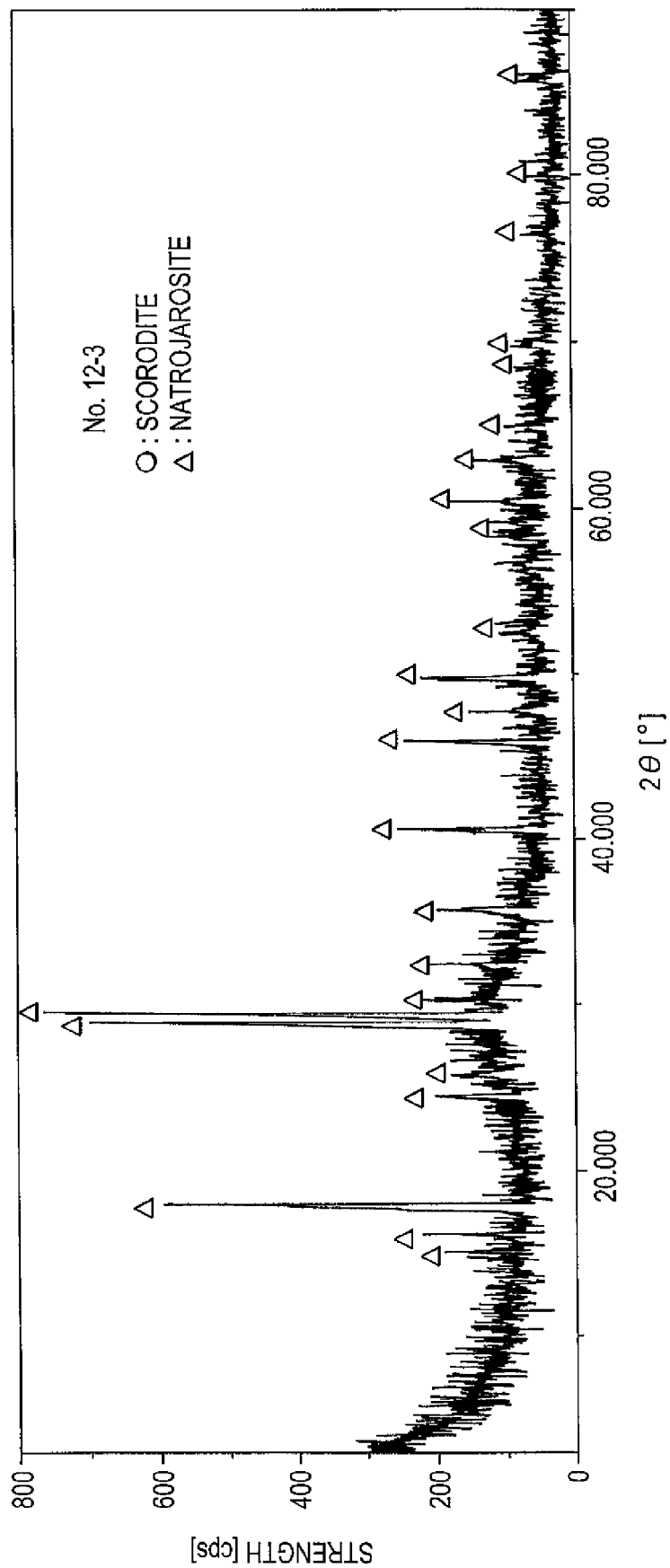
FIG. 3 shows the XRD of scorodite crystal in Comparative Example 1 of the invention.

Ferric sulfate solution (formed by dissolving 57.3 g of Ferric sulfate reagent (n hydrate, iron(III) content was about 21.3%) in warm water, 2.0 equivalents of iron(III) based on arsenic) was added to 23.7 g of 60% arsenic acid solution manufactured by Wako Pure Chemical Industries, Ltd. (the content of arsenic was 33.8%). Then, the solution was diluted with water to 640 mL. Since the pH of the mixed solution was 0.75, 46 mL of 25% NaOH solution was added to adjust the pH to 1.5. Na concentration in the mixed solution was 10.3 g/L (measured by an ICPAES analyzer, Model No. SPS3100 available from Seiko Instruments Inc.). Then, the solution was heated to 95° C., during which the amount of the solution was concentrated to 640 mL, and the scorodite synthesis was conducted for 24 hours. During the heating, the amount of the solution was kept to 640 mL by adding water as appropriate to prevent the excessive decrease of the solution due to evaporation. Although the reaction did not progress immediately after the mixture of the sulfuric acid-leached solution and ferric sulfate solution at room temperature, yellow precipitation was observed at around 60° C. as the mixture was heated. After the scorodite synthesis, the obtained crystal was filtered and separated into solid and liquid. The crystal was washed with water, and the wash water was added to the post-filtration solution. Table 5 shows the amount of the obtained crystal and post-crystal filtration solution. The arsenic content in the product was 19% and the arsenic concentration ratio was lower. FIG. 3 shows the XRD of the obtained crystal. The obtained crystal was Natrojarosite, and crystalline scorodite, which is believed to shows little arsenic elution and be stable, was not obtained. It is thought that the formation of Natrojarosite hampered the formation of crystalline scorodite. Although the actual form of arsenic in the product is unknown, it is speculated to be in the form of amorphous scorodite. Incidentally, arsenic elution from the crystal obtained by this synthesis was 4.9 mg/L (TCLP, acetic acid buffer solution having the pH of 5 was used), therefore it was confirmed that the arsenic was unstable. The result also shows that the obtained scorodite was amorphous.

solution was heated to 95° C., during which the amount of the solution was concentrated to 640 mL, and the scorodite synthesis was conducted for 72 hours. During the heating, the amount of the solution was kept to 640 mL by adding water as appropriate to prevent the excessive decrease of the solution due to evaporation. Although the reaction did not progress immediately after the mixture of the sulfuric acid-leached solution and ferric sulfate solution at room temperature, brown precipitation was observed at around 60° C. as the mixture was heated. After the scorodite synthesis, the obtained crystal was filtered and separated into solid and liquid. The crystal was washed with water, and the wash water

TABLE 5 arsenic acid solution

| amount (g) | 23.7 content (%) | number of moles (mol) | (molecular weight) |
|---|---|---|---|
| T-As | 33.8 | 0.107 | 74.92 |
| T-Fe | 0.0 | | |
| | | | | ferric sulfate (n hydrate)

| amount (g) | 57.3 content (%) | number of moles (mol) | (molecular weight) |
|---|---|---|---|
| T-As | 0.0 | | |
| T-Fe | 21.3 | 0.218 | 55.85 |
| S | 18.3 | 0.327 | 32.070 |
| Na | | | | adjusting pH to 1.5 with 46 mL of 25% NaOH solution scorodite synthesis pH = 1.5, 95° C. 24 hrs

| amount (ml) | 640 content (%) | number of moles (mol) | (molecular weight) |
|---|---|---|---|
| T-As | 12.5 | 0.107 | 74.92 |
| T-Fe | 19.0 | 0.218 | 55.85 |
| S | 16.4 | 0.327 | 32.070 |
| Na | 10.3 | 0.288 | 22.990 | crystal

| amount (Dg) | 32.0 content (%) | number of moles (mol) | (molecular weight) |
|---|---|---|---|
| T-As | 19.0 | 0.081 | 74.92 |
| T-Fe | 29.0 | 0.166 | 55.85 |
| S | 5.1 | 0.051 | 32.070 |
| Na | 1.3 | 0.018 | 22.990 | post-filtration solution

| amount (ml) | 1740 content (%) | number of moles (mol) | (molecular weight) |
|---|---|---|---|
| T-As | 1.02 | 0.024 | 74.92 |
| T-Fe | 1.93 | 0.060 | 55.85 |
| S | | 0.000 | 32.070 |
| Na | | 0.000 | 22.990 |

Comparative Example 2

Figure 4:
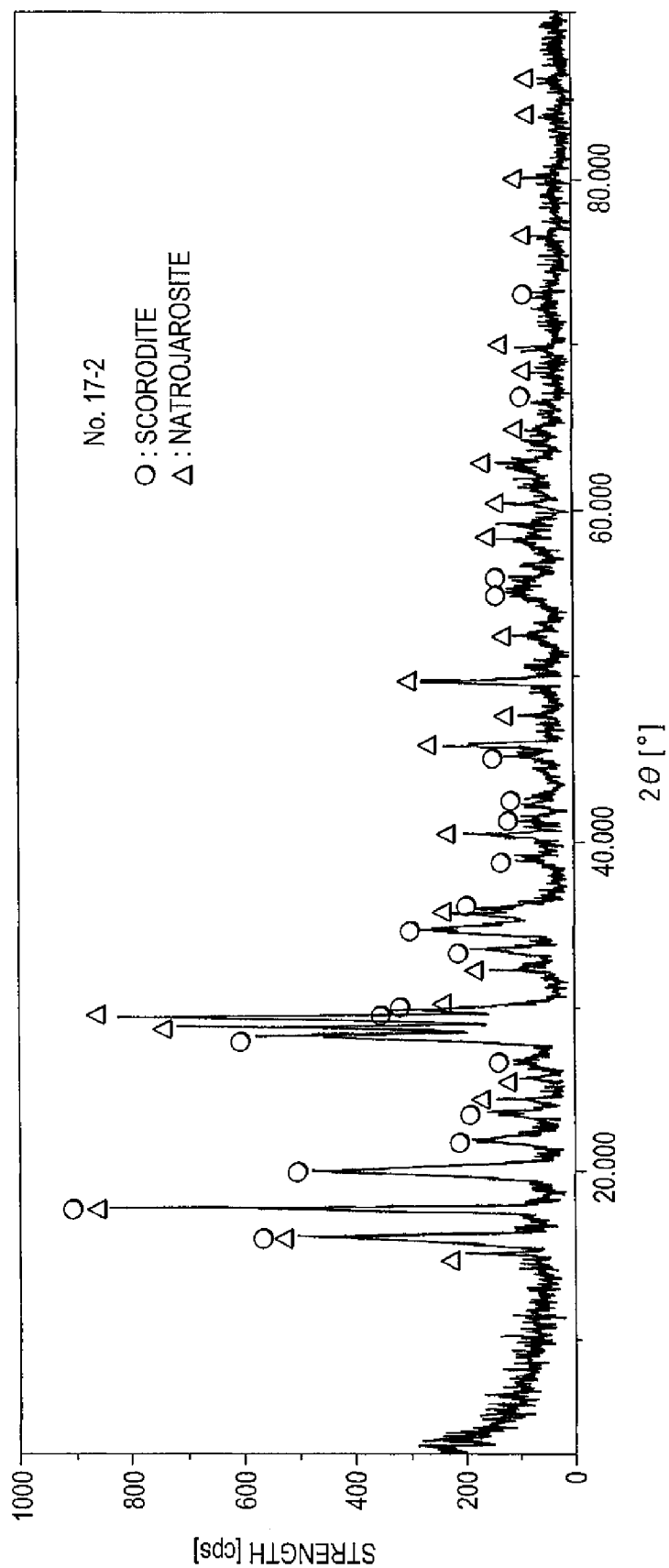
FIG. 4 shows the XRD of scorodite crystal in Comparative Example 2 of the invention.

Ferric sulfate solution (formed by dissolving 57.3 g of ferric sulfate reagent (n hydrate, iron(III) content rate was about 21.3%) in warm water, 2.0 equivalents of iron(III) based on arsenic) was added to 23.7 g of 60% arsenic acid solution manufactured by Wako Pure Chemical Industries, Ltd. (the content of arsenic was 33.8%). Then, the solution was diluted with water to 640 mL. Since the pH of the mixed solution was 0.64, 26.3 mL of 25% NaOH solution was added to adjust the pH to 1.0. Na concentration in the mixed solution was 5.9 g/L (measured by an ICPAES analyzer, Model No. SPS3100 available from Seiko Instruments Inc.) Then, the solution was heated to 95° C., during which the amount of the was added to the post-filtration solution. Table 6 shows the amount of the obtained crystal and post-crystal filtration solution. The arsenic content in the product was 21% and the arsenic concentration ratio was lower. FIG. 4 shows the XRD of the obtained crystal. The obtained crystal was the mixture of Natrojarosite and crystalline scorodite.

Incidentally, arsenic elution from the scorodite obtained by this synthesis was 0.4 mg/L (TCLP, acetic acid buffer solution having the pH of 5 was used), therefore it was confirmed that the arsenic was stable. The result also shows that the obtained scorodite was crystalline.

TABLE 6 arsenic acid solution

| amount (g) | 23.7 content (%) | number of moles (mol) | (molecular weight) |
|---|---|---|---|
| T-As | 33.8 | 0.107 | 74.92 |
| T-Fe | 0.0 | | |
| | | | | ferric sulfate (n hydrate)

| amount (g) | 57.3 content (%) | number of moles (mol) | (molecular weight) |
|---|---|---|---|
| T-As | 0.0 | | |
| T-Fe | 21.3 | 0.218 | 55.85 |
| S | 18.3 | 0.327 | 32.070 |
| Na | | | | adjusting pH to 1.0 with 26.3 mL of 25% NaOH solution scorodite synthesis pH = 1.0, 95° C. 72 hrs

| amount (ml) | 640 content (%) | number of moles (mol) | (molecular weight) |
|---|---|---|---|
| T-As | 12.5 | 0.107 | 74.92 |
| T-Fe | 19.0 | 0.218 | 55.85 |
| S | 16.4 | 0.327 | 32.070 |
| Na | 5.9 | 0.164 | 22.990 | crystal

| amount (Dg) | 35.9 content (%) | number of moles (mol) | (molecular weight) |
|---|---|---|---|
| T-As | 21.0 | 0.081 | 74.92 |
| T-Fe | 27.0 | 0.166 | 55.85 |
| S | 5.6 | 0.051 | 32.070 |
| Na | 1.3 | 0.018 | 22.990 | post-filtration solution

| amount (ml) | 1880 content (%) | number of moles (mol) | (molecular weight) |
|---|---|---|---|
| T-As | 1.04 | 0.001 | 74.92 |
| T-Fe | 1.23 | 0.041 | 55.85 |
| S | 4.9 | 0.287 | 32.070 |
| Na | 1.77 | 0.145 | 22.990 |

Comparative Example 3

Ferric sulfate solution (formed by dissolving 57.3 g of ferric sulfate reagent (n hydrate, iron(III) content rate was about 21.3%) in warm water, 2.0 equivalents of iron(III) based on arsenic) was added to 23.7 g of 60% arsenic acid solution manufactured by Wako Pure Chemical Industries, Ltd. (the content of arsenic was 33.8%). Then, the solution was diluted with water to 640 mL. Since the pH of the mixed solution was 0.58, 30.5 mL of 25% NaOH solution was added to adjust the pH to 1.5. Na concentration in the mixed solution was 11.7 g/L (measured by an ICPAES analyzer, Model No. SPS3100 available from Seiko Instruments Inc.). Then, the solution was heated to 95° C., during which the amount of the solution was concentrated to 640 mL, and the scorodite synthesis was conducted for 72 hours. During the heating, the amount of the solution was kept to 640 mL by adding water as appropriate to prevent the excessive decrease of the solution due to evaporation. Although the reaction did not progress immediately after the mixture of the sulfuric acid-leached solution and ferric sulfate solution at room temperature, brown precipitation was observed at around 40° C. and the color changed to yellowish brown at around 50° C. as the mixture was heated. After the scorodite synthesis, the obtained crystal was filtered and separated into solid and liquid. The crystal was washed with water, and the wash water was added to the post-filtration solution. Table 7 shows the amount of the obtained crystal and post-crystal filtration solution. The arsenic content in the product was 18% and the arsenic concentration ratio was lower. FIG. 5 shows the XRD of the obtained crystal. The obtained crystal was the mixture of Natrojarosite and crystalline scorodite.

Incidentally, arsenic elution from the scorodite obtained by this synthesis was less than 0.1 mg/L (TCLP, acetic acid buffer solution having the pH of 5 was used), therefore it was confirmed that the arsenic was stable. The result also shows that the obtained scorodite was crystalline.

TABLE 7 arsenic acid solution

| amount (g) | 23.7 content (%) | number of moles (mol) | (molecular weight) |
|---|---|---|---|
| T-As | 33.8 | 0.107 | 74.92 |
| T-Fe | 0.0 | | |
| | | | | ferric sulfate (n hydrate)

| amount (g) | 57.3 content (%) | number of moles (mol) | (molecular weight) |
|---|---|---|---|
| T-As | 0.0 | | |
| T-Fe | 21.3 | 0.218 | 55.85 |
| S | 18.3 | 0.327 | 32.070 |
| Na | | | | adjusting pH to 1.5 with 30.5 mL of 25% NaOH solution

TABLE 7-continued scorodite synthesis pH = 1.5, 95° C. 72 hrs

| amount (ml) | 640 content (%) | number of moles (mol) | (molecular weight) |
|---|---|---|---|
| T-As | 12.5 | 0.107 | 74.92 |
| T-Fe | 19.0 | 0.218 | 55.85 |
| S | 16.4 | 0.327 | 32.070 |
| Na | 11.7 | 0.164 | 22.990 | crystal

| amount (Dg) | 43.1 content (%) | number of moles (mol) | (molecular weight) |
|---|---|---|---|
| T-As | 18.0 | 0.104 | 74.92 |
| T-Fe | 28.0 | 0.216 | 55.85 |
| S | 6.8 | 0.091 | 32.070 |
| Na | 1.9 | 0.036 | 22.990 | post-filtration solution

| amount (ml) | 1650 content (%) | number of moles (mol) | (molecular weight) |
|---|---|---|---|
| T-As | 0.02 | 0.000 | 74.92 |
| T-Fe | 0.15 | 0.004 | 55.85 |
| S | 5.3 | 0.273 | 32.070 |
| Na | 4.37 | 0.314 | 22.990 |

What is claimed is:

1. A method for manufacturing crystalline scorodite from acidic aqueous solution containing pentavalent As and trivalent Fe, the method comprising a step for adding a basic sodium compound to the acidic aqueous solution such that the sodium concentration in the acidic aqueous solution becomes larger than 0 g/L and equal to or less than 4 g/L.

2. The method for manufacturing crystalline scorodite claimed in claim 1 wherein said basic sodium compound is at least one compound selected from the group consisting of sodium carbonate, sodium hydroxide, and sodium hydrogen carbonate.

3. The method for manufacturing crystalline scorodite claimed in claim 1 wherein the pH of said acidic aqueous solution is less than 1.0 before the addition of said basic sodium compound and is 1.0 to 1.5 after the addition.

4. The method for manufacturing crystalline scorodite claimed in claim 1 wherein the trivalent Fe is provided as ferric sulfate.

5. The method for manufacturing crystalline scorodite claimed in claim 1 wherein said acidic aqueous solution is sulfuric acid-leached solution from electrolytically precipitated copper.

* * * * *